US012607130B2

(12) United States Patent
Lauer et al.

(10) Patent No.: US 12,607,130 B2
(45) Date of Patent: Apr. 21, 2026

(54) MODULE FOR A TURBOMACHINE

(71) Applicant: MTU Aero Engines AG, Munich (DE)

(72) Inventors: Christoph Lauer, Munich (DE); Markus Schlemmer, Mainburg / Sandelzhausen (DE)

(73) Assignee: MTU Aero Engines AG, Munich (DE)

( * ) Notice: Subject to any disclaimer, the term of this patent is extended or adjusted under 35 U.S.C. 154(b) by 0 days.

(21) Appl. No.: 18/737,012

(22) Filed: Jun. 7, 2024

(65) Prior Publication Data

US 2025/0012199 A1 Jan. 9, 2025

(30) Foreign Application Priority Data

Jul. 6, 2023 (DE) ..................... 10 2023 117 910.1

(51) Int. Cl.
*F01D 11/02* (2006.01)

(52) U.S. Cl.
CPC .......... *F01D 11/02* (2013.01); *F05D 2240/55* (2013.01)

(58) Field of Classification Search
CPC .... F01D 11/001; F01D 11/02; F05D 2240/55; F16J 15/44; F16J 15/441; F16J 15/442; F16J 15/447; F16J 15/4472; F16J 15/4476
See application file for complete search history.

(56) References Cited

U.S. PATENT DOCUMENTS

| | | | | |
|---|---|---|---|---|
| 10,808,561 | B2 | 10/2020 | Schlemmer et al. | |
| 10,865,651 | B2 | 12/2020 | Schlemmer et al. | |
| 2018/0340435 | A1* | 11/2018 | Schlemmer | F01D 25/246 |
| 2019/0234225 | A1* | 8/2019 | Lauer | F01D 11/001 |

FOREIGN PATENT DOCUMENTS

| | | | |
|---|---|---|---|
| DE | 2117475 | A | 11/1971 |
| DE | 102021113833 | A1 | 12/2022 |
| DE | 102022124401 | A1 | 3/2024 |
| EP | 2696038 | B1 | 7/2018 |
| EP | 2551454 | B1 | 8/2019 |
| EP | 3409897 | B1 | 12/2019 |
| EP | 3483399 | B1 | 9/2020 |
| FR | 3108358 | A1 | 9/2021 |
| GB | 2606552 | A | 11/2022 |

* cited by examiner

*Primary Examiner* — Elton K Wong
(74) *Attorney, Agent, or Firm* — Hinckley, Allen & Snyder LLP; David R. Josephs

(57) ABSTRACT

The present invention relates to a module for a turbomachine, with a guide vane arrangement, a seal carrier, which is arranged radially inside an inner platform of the guide vane arrangement, seal carrier walls, namely, a first seal carrier wall and a second seal carrier wall, and a sliding member as well as a connecting element, wherein the first seal carrier wall and the seal carrier are formed in a one-piece manner with each other, and wherein the seal carrier walls are multipiece in construction relative to each other, and the second seal carrier wall is fastened to the first seal carrier wall and the seal carrier by way of the connecting element, wherein the sliding member holds the seal carrier walls spaced apart from each other in such a manner that they bound axially an intervening space with each other.

9 Claims, 8 Drawing Sheets

MODULE FOR A TURBOMACHINE

BACKGROUND OF THE INVENTION

The present invention relates to a module for a turbomachine.

The turbomachine can involve, for example, a jet engine, such as, for example, a turbofan engine. Functionally, the turbomachine is divided into a compressor, a combustion chamber, and a turbine. In the case of the jet engine, air intake is compressed in the compressor and undergoes combustion with admixed kerosene in the downstream combustion chamber. The hot gas formed, a mixture consisting of combustion gas and air, flows through the downstream turbine and thereby undergoes expansion. In the process, the turbine also withdraws energy proportionately from the hot gas in order to drive the compressor. As a rule, the turbine and the compressor are each constructed with multiple stages, each stage having a guide vane cascade and a rotating blade cascade.

The subject of the present invention is a module with a guide vane arrangement and a seal carrier. The guide vanes of the guide vane arrangement extend radially between a radially external outer platform and a radially internal inner platform. The seal carrier is arranged radially inside this inner platform and forms a part of the so-called inner air seal (IAS). The seal carrier helps to reduce or prevent gas losses, which is of advantage with regard to the efficiency of the turbomachine. As large a proportion of the fluid as possible and, insofar as feasible, the entire fluid or gas should flow through the gas channel of the turbomachine.

SUMMARY OF THE INVENTION

The present invention is based on the technical problem of specifying an especially advantageous module for a turbomachine.

This problem is solved in accordance with the invention by a module according to the present invention, wherein the seal carrier and the guide vane arrangement are mounted relative to each other by means of a first seal carrier wall and a second seal carrier wall, whereby the seal carrier walls axially bound an intervening space with each other, in which the guide vane arrangement engages from radially outward with at least one guide pin. The second seal carrier wall is thereby provided in a multipiece manner with respect to the first seal carrier wall, that is, it is assembled as a previously separate part with the first seal carrier wall and fastened to it. This fastening is accomplished using a connecting element, whereby a sliding member arranged in the intervening space holds the seal carrier walls at the defined distance, so that they bound the intervening space.

Although the second seal carrier wall is fastened to the first carrier wall and thus the seal carrier is fastened by way of the sliding member and the connecting element, it is provided spaced apart from the wall surface of the first seal carrier wall facing in the axial direction and also apart from the seal carrier itself. Said wall surface of the first seal carrier wall faces the second seal carrier wall, that is, in other words, it bounds the intervening space in the axial direction. The second seal carrier wall is spaced apart with respect to this wall surface and also with respect to the seal carrier itself, that is, in other words, rests neither against this wall surface nor against the seal carrier itself.

The spacing can be of advantage in that, for example, on the one hand, an axial input of force in the connecting element can thus be reduced or prevented, thereby making it possible to increase, for example, the robustness of the multipart construction or to create possibilities for a reduction in weight. On the other hand, as a result of the spacing from the seal carrier, it is possible to reduce or prevent a radial input of force into the seal carrier; that is, for example, it is possible to avoid any tilting of the seal carrier. Such a tilting could occur temporarily, for example, owing to a transient temperature behavior and then, among other things, lead to a permanent lack of sealing. In summary, in spite of the seal walls being multipart in construction with respect to each other, the spacing makes it possible to realize an advantageous construction in terms of robustness and sealing.

For example, the multipiece nature of the seal carrier walls can be of advantage in regard to manufacture, because, in comparison, in the case of two seal walls formed monolithically with the seal carrier and a material-removing manufacturing of the intervening space, for instance, the intervening space would have to be exposed through a relatively deep penetration. Independently from this, the multipiece nature can also open up possibilities in the choice of material or the thickness of material; that is, namely, the second seal carrier wall can be thinner, for example, and can be provided, in particular, in the form of a sheet metal. That is, it can offer leeway for an optimization in terms of weight. The seal carrier is provided in a one-piece manner with the first seal carrier wall, which, in turn, can create stability (in spite of the seal carrier walls being multipart in construction with respect to each other).

Preferred embodiments are found in the dependent claims and in the entire disclosure, whereby, in the description of the features, a distinction is not always made in detail between the module and the turbomachine or corresponding methods or uses. The disclosure is to be read in terms of all claim categories.

In the scope of this disclosure, the specification "in a one-piece manner" means that separation is not possible without destruction; that is, in general, the specification can also relate to two parts, for example, that are connected to each other in a joining process, such as, for instance, parts that are welded to each other. Preferably, however, the one-piece nature entails a monolithic design; for example, the parts in question, namely, the seal carrier and the first seal carrier wall (or, for example, also a seal carrier wall and its axial segment/web, see below), are therefore formed continuously from the same material without breaks in the material. In other words, "monolithic" means an integral design without any material boundary in between.

The first seal carrier wall and the seal carrier are formed together in a one-piece manner, preferably monolithically. Because the second seal carrier wall is set in place separately and, accordingly, the intervening space need not be taken into consideration during the manufacture of the seal carrier, it is possible to simplify the monolithic manufacture of the seal carrier and the first seal carrier wall, for example, by casting. Therefore, for example, the intervening space does not need to be introduced in a tedious material-removing manner (see above).

In general, in the scope of this disclosure, the terms "axially" and "axial direction" refer to the longitudinal axis of the module, that is, the longitudinal axis of the turbomachine. For example, this longitudinal axis can coincide with an axis of rotation, around which the rotating blades associated with the guide vane arrangement rotate during operation. "Radially" relates to the radial directions that are perpendicular to and are directed away from the longitudinal axis and the "rotation" or the "direction of rotation" relates to a rotation around the longitudinal axis. "Inward" and "outward" relate, unless explicitly stated otherwise, to the radial direction; therefore, "inward" is nearer to the longitudinal axis than "outward." Insofar as reference is made to an axial segment, this relates to a sectional plane that contains the longitudinal axis.

The seal carrier can carry a sealing element radially inward, for example, which can seal inward with respect to a sealing structure, such as, for instance, a sealing tip that rotates together with the shaft or the rotating blades during operation. As sealing element, it is possible to provide, for example, a brush seal or a so-called honeycomb seal or, in general terminology, a run-in lining. As explained below in detail, the first seal carrier wall is formed with the seal carrier preferably in a monolithic manner, whereby, as viewed in an axial section, the two of them can form a T shape (the first seal carrier wall is therefore spaced apart from the axial ends of the seal carrier).

In general, the connecting element can involve, for example, a screw or a bolt; preferably, however, it is realized in the form of a rivet. Independently from this, the seal carrier walls can be fastened to each other through a plurality of connecting elements (or sliding members) distributed over the periphery and these sliding members can form, in particular, a so-called spoke centering (see below in detail). In general, "a" or "an" in the scope of the disclosure, unless explicitly stated otherwise, is to be read as an indefinite article and thus always as "at least one."

In a preferred embodiment, the first carrier wall and the second seal carrier wall form a contact-free labyrinth seal with each other and/or the second seal carrier wall and the seal carrier form a contact-free labyrinth seal with each other. Thus, the first carrier wall and the second seal carrier wall do not touch each other ("contact-free"), but nonetheless the labyrinth seal can achieve a good sealing effect through, for example, a (multiple) diversion of a leakage flow. Quite generally, this can be achieved by an overlap of a leakage flow in the axial direction and/or in the radial direction; therefore, as viewed in an axial section, a line that is perpendicular to the axis can pass through both the first seal carrier wall and the second seal carrier wall and/or a line that is parallel to the axis can pass through both a seal carrier wall and the seal carrier.

In accordance with a preferred embodiment, at least one of the seal carrier walls comprises an axial segment that protrudes in the axial direction with respect to the seal carrier wall and constitutes part of the contact-free labyrinth seal or forms it. As viewed in an axial section, the axial segment can bound an axially extending channel of the labyrinth seal. Preferably, both the first seal carrier wall and the second seal carrier wall can each be provided with a corresponding axial segment, whereby the axial segments can together bound the axial channel.

Insofar as, in the context of the labyrinth seal or below in connection with the radial contact, reference is made to an "axial segment" of the respective seal carrier wall, this axial segment is formed together with the respective seal carrier wall, preferably in a one-piece manner, in particular monolithically. As viewed in an axial section, the axial segment can be provided in the form of a web, such as, for example, one that can have a greater extension in the axial direction than in the radial direction.

In accordance with a preferred embodiment, at least one of the seal carrier walls, as viewed in an axial section, is formed with a step. This step can jointly bound the labyrinth seal together with an axial segment of the other seal carrier wall, for example. As viewed in the axial section, the previously mentioned straight line can pass from radially inward to radially outward, for example, initially through the step and then through the axial segment of the other seal carrier wall; preferably, it can then pass once again through the seal carrier wall with the step. In other words, the seal carrier wall with the step can have, in addition, an axial segment that, together with the step, forms an axially oriented U shape, in which the other seal carrier wall engages with an axial segment.

For formation of the contact-free labyrinth seal between the second seal carrier wall and the seal carrier, the latter can have a radially extending flank on, for example, a step or, in particular, a radial segment that rises radially outward, Together with the second seal carrier wall, this flank can bound the labyrinth seal, that is, a radially extending channel of the labyrinth seal. The radial segment can preferably be provided in a one-piece manner, in particular monolithically, with the seal carrier, such as, for example, as a web that rises radially outward.

In accordance with an embodiment that is an alternative to the contact-free labyrinth seal, the second seal carrier wall is spaced apart from the seal carrier and is also axially spaced apart with respect to the wall surface of the first seal carrier wall, but nonetheless has a radial contact with the first seal carrier wall. "Radial contact" means here that the two of them are pressed radially against each other; that is, for example, a radial compression increases the contact pressure in the contact surface (whereas a radial pulling apart would reduce the contact pressure in the contact surface).

As viewed in an axial section, the contact surface in which the radial contact exists is preferably aligned essentially axis-parallel, that, is, for example, tilted by no more than 20°, 10°, or 5°, with respect to the longitudinal axis and preferably truly axis-parallel. Regardless of these details, too, there exists a resting support on account of the radial contact and the sealing is therefore achieved by a snug fit between the seal carrier walls. They can rest against each other in a frictionally fit manner, but, for example, are joined to each other in a material-bonded manner, as a result of which, for example, mechanical stresses can be reduced.

The second seal carrier wall is spaced apart from the seal carrier; correspondingly, in comparison to the seal carrier, the radial contact is also displaced radially outward. As a result of this radial displacement, it is possible in spite of the frictional fit to reduce an input of force in the seal carrier, that is, for example, to prevent any tilting (see above). Preferably, the first seal carrier wall comprises an axial segment that protrudes axially with respect to the second seal carrier wall, in particular a web that is formed in a one-piece manner or monolithically with it (see above), which forms the radial contact with the second seal carrier wall. In relation to the seal carrier, the axial segment is displaced radially outward. In general, the second seal carrier wall can hereby also be designed to be shortened, that is, with its radially inner end resting directly against (more or less resting on top of) the axial segment of the first seal carrier wall.

In a preferred embodiment, however, the second seal carrier wall also has an axial segment, which, in particular, can be formed as a web provided with it in a one-piece manner or monolithically (see above) and likewise is displaced radially outward (in relation to the seal carrier). The axial segment of the second seal carrier wall protrudes with respect to the first seal carrier wall and forms the radial contact with the axial segment of it. The axial segment of the second seal carrier wall can hereby be arranged radially inward or outward of the axial segment of the first seal carrier wall, that is, can rest against it radially inward or radially outward.

In accordance with a preferred embodiment, which can relate to both the contact-free labyrinth seal and the radial contact, the seal carrier is positioned exclusively by way of the first seal carrier wall. As viewed in an axial section, it is therefore possible, for example, for an axis-parallel straight line that lies radially outside the seal carrier (that is, no longer passes through the seal carrier) to pass through exclusively the first seal carrier wall, that is, not the second seal carrier wall. An axis-parallel straight line that lies further radially outward in the region of the intervening space then obviously passes through the two seal carrier walls. In other words, it can give rise to an annular space radially between the seal carrier and the second seal carrier wall, in which exclusively the first seal carrier wall is present.

Preferably, the seal carrier has no segments that extend/rise radially outward. As viewed in an axial section, no segments or the like, for example, apart from the first seal carrier wall, extend away from seal carrier radially outward; that is, the two of them form a T shape. In other words, exclusively the first carrier wall, which is formed with the seal carrier in a one-piece manner or monolithically, preferably rises from the seal carrier and extends radially outward.

In relation to working gas flowing through the gas channel of the module and, for example, flowing around the rotating blades of the rotating blade arrangement, "front" means upstream and "back" means downstream. In a preferred embodiment, the first seal carrier wall is arranged in front and the second seal carrier wall is arranged in back, that is, the first seal carrier wall is upstream and the second is downstream. In the present disclosure, reference is fundamentally made to the first seal carrier wall and the second seal carrier wall, whereby, at the same time, "first" is always to be read as "front" and "second" as "back."

In general, the sliding member can also be provided monolithically, for example, with one of the seal carrier walls, that is, the first seal carrier wall or, in particular, the second seal carrier wall. In a preferred embodiment, however, it is provided in a multipiece manner with respect to the seal carrier walls and the connecting element passes through it axially. The latter is preferred, but not essential in the case of a monolithic design. The connecting element, which passes through the multipiece sliding member, holds it radially in a form-fitting manner between the seal carrier walls and the sliding member is then additionally clamped axially, for example.

In a preferred embodiment, the second seal carrier wall has a smaller thickness than the first seal carrier wall; that is, the multipiece nature is utilized for an optimization of weight. The thicknesses are hereby each viewed in an axial section, whereby, in the case of a thickness that varies over the extension of the respective seal carrier wall, a mean value is used as basis.

In accordance with a preferred embodiment, the second seal carrier wall is formed from a sheet metal, which makes possible an especially thin design and/or a simple manufacture. In general, the sheet metal can be segmented in the direction of rotation, that is, can be provided in a multipart manner. Preferably, however, there is a continuous design in the direction of rotation, that is, a design that is not divided/segmented.

The guide pin, with which the guide vane arrangement engages in the intervening space, extends radially inward from the inner platform of the guide vane arrangement. With respect to the direction of rotation, the guide pin rests preferably against the sliding member, that is, on the rotation side. In a preferred embodiment, it surrounds the sliding member together with a further guide pin, which rests against the opposite side of the sliding member in the direction of rotation. The sliding member is therefore held between the guide pins, this also being referred to as a tang ("tongs"). The guide pins and the sliding member can still slide against each other radially, whereby, distributed along the periphery, there are a plurality of correspondingly held sliding members, that is, the arrangement then represents a spoke centering.

The invention also relates to a turbine for a turbomachine, in particular for an aircraft engine that has a presently disclosed module.

BRIEF DESCRIPTION OF THE DRAWING FIGURES

The invention will be explained in detail below on the basis of an exemplary embodiment, whereby the individual features in the framework of the dependent claims can also be essential to the invention in other combination and, furthermore, no distinction is made individually between the different claim categories.

Shown in detail are:

DESCRIPTION OF THE INVENTION

Figure 1:
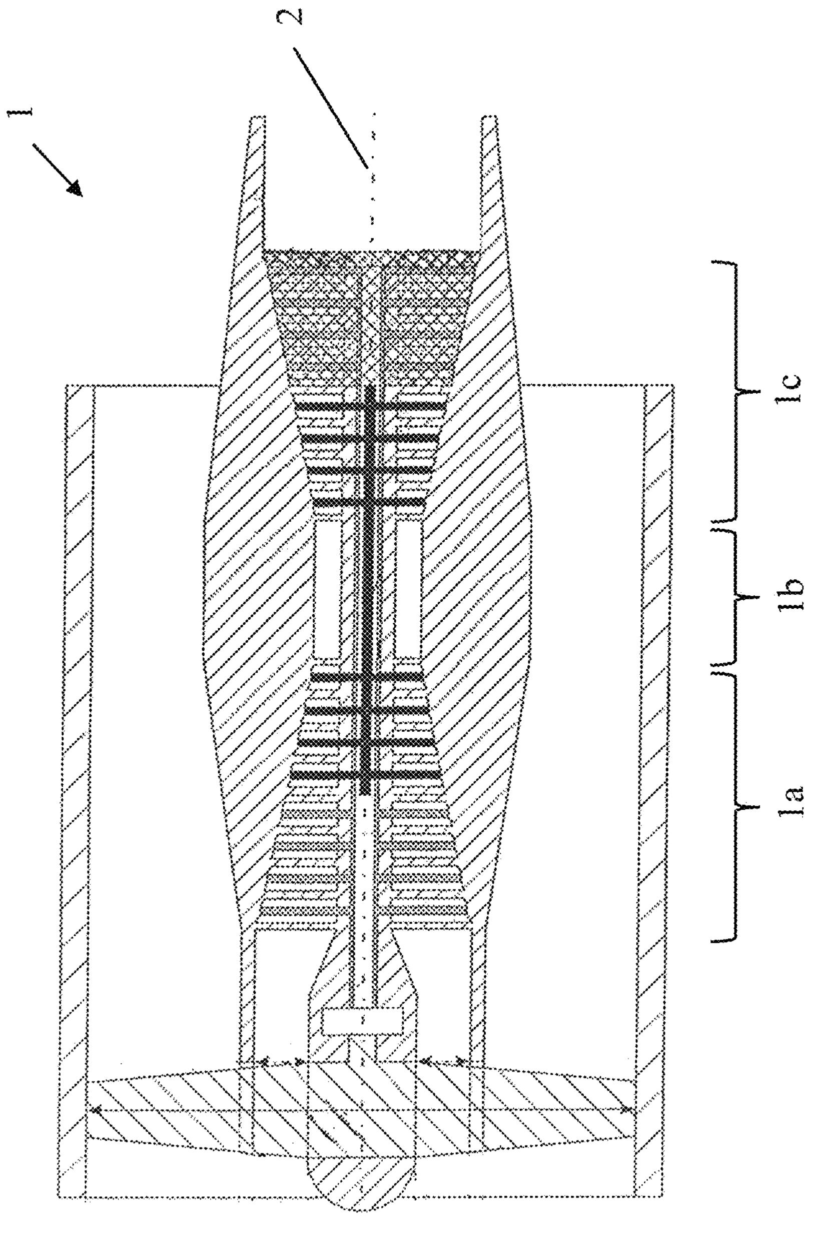
FIG. 1 is a jet engine in an axial section.

FIG. 1 shows a turbomachine 1 in a schematic view, specifically a jet engine. The turbomachine 1 is divided functionally into a compressor 1*a*, a combustion chamber 1*b*, and a turbine 1*c*. Both the compressor 1*a* and the turbine 1*c* are each constructed with a plurality of stages, each stage composed of a guide vane cascade and a rotating blade cascade or comprising an (axially frontmost or backmost) rotating blade cascade. In the case of the turbine 1*c* and/or the compressor 1*a*, a rotating blade cascade can be arranged in each instance downstream of the associated guide vane cascade insofar as the stage in question comprises a guide vane cascade. During operation, the rotating blades rotate around the longitudinal axis 2.

Figure 2:
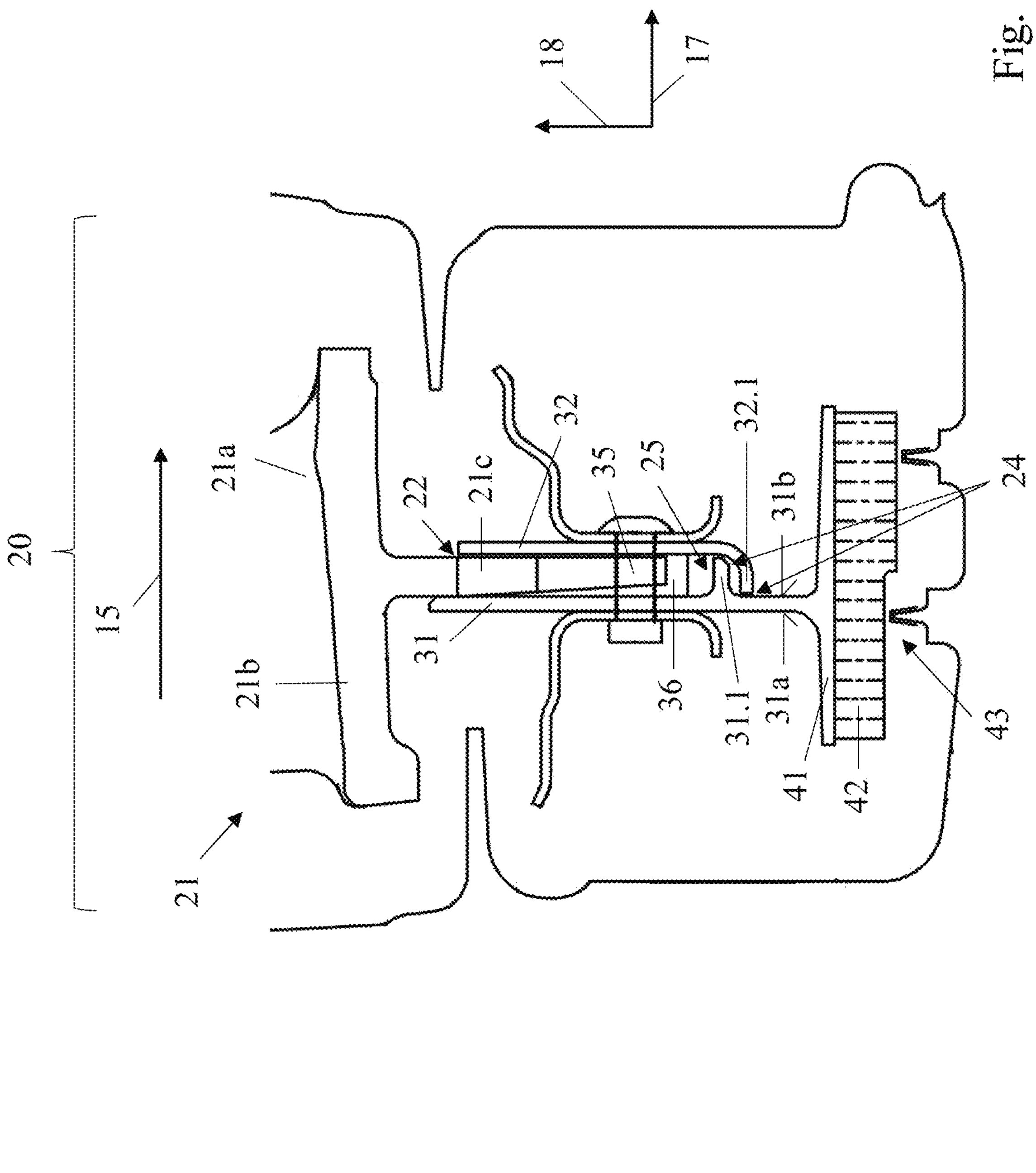
FIG. 2 is a first module according to the invention with a guide vane arrangement and a seal carrier in an axial section.

FIG. 2 shows, as module 20, a cutout of the turbine 1*c*, once again in an axial section. Seen in detail is a guide vane arrangement 21 with a guide vane 21*a* and an inner platform 21*b* as well as with a guide pin 21*c*. The guide vane 21*a* is arranged radially outward on the inner platform 21*b* and the guide pin 21*c* extends radially inside of it into an intervening space 22. This intervening space 22 is bounded axially between a first, front seal carrier wall 31 and a second, back seal carrier wall 32. In relation to a throughflow 15 of the module 20, the first seal carrier wall 31 lies upstream and the second seal carrier wall 32 lies downstream.

The first seal carrier wall 31 is formed monolithically with a seal carrier 41, the two of which can be manufactured, for example, as cast parts. Provided on the seal carrier 41 radially inward is a sealing element 42, such as, for example, a honeycomb seal. The sealing element 42 seals against a sealing structure 43, which, in the present instance, is depicted only schematically as a contour and, during operation, rotates together with the shaft.

The second seal carrier wall 32 is provided in a multipiece manner with respect to the first seal carrier wall 31 and fastened to it by way of a connecting element 35, which, in the present case, is a rivet. The connecting element 35 passes through a sliding member 36, which holds the seal carrier walls 31, 32 at the defined axial distance. In relation to an axial direction 17, the first seal carrier wall 31 has a wall surface 31*a* that faces away from the intervening space 22 and, in the present instance, is directed upstream as well as a wall surface 31*b* that faces the intervening space 22 and, in the present instance, is directed downstream.

The second seal carrier wall 32 is hereby spaced apart from the wall surface 31*b* of the first seal carrier wall 31 in the axial direction 17. Therefore, there is a gap 24 between the axial segment 32.1 of the second seal carrier wall 32, which, in the present example, is formed on its radially inner end, and the first seal carrier wall 31 or the wall surface 31*b*. However, this gap is relatively small and therefore cannot be seen in detail in the present illustration. Accordingly, it is possible to reduce, for example, an input of force in the connecting element 35 (see above in detail).

Furthermore, the second seal carrier wall 32 is also spaced apart from the seal carrier 41, that is, is provided at a distance from it in the radial direction 18. As explained at the beginning, this can prevent an input of force in the seal carrier and thus any tilting. The seal carrier walls 31, 32 hereby form a contact-free labyrinth seal 25 with each other, which, in the present instance, results from the overlap between the axial segment 32.1 of the second seal carrier wall 32 and an axial segment 31.1 of the first seal carrier wall 31. In spite of the gap 24 between the axial segment 31.1 and the seal carrier wall 32 as well as the gap 24 between the axial segment 32.1 and the first seal carrier wall 31, it is possible to achieve a relative sealing with the contact-free labyrinth seal 25 owing to the diversion of the leakage flow.

Figure 3:
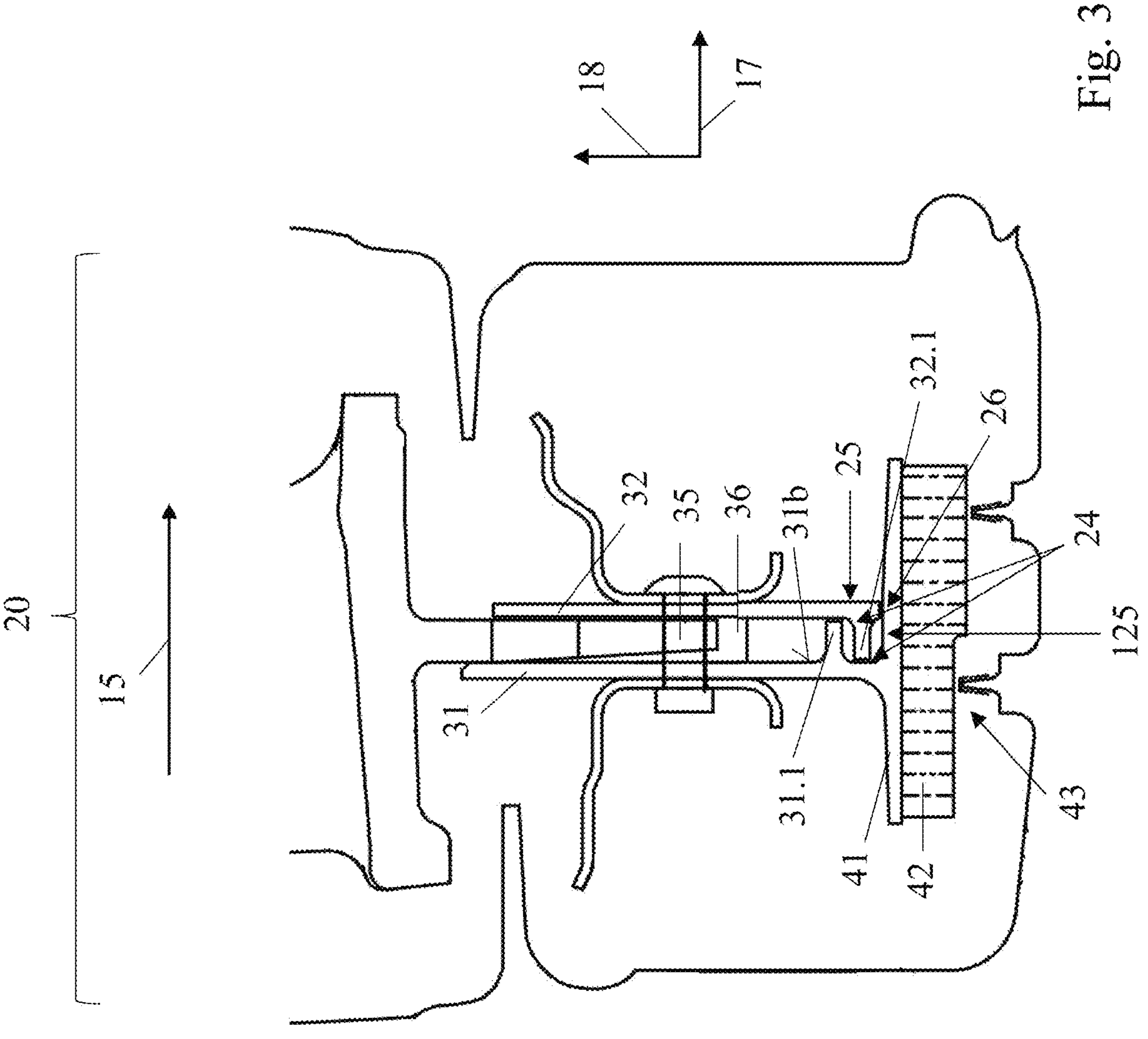
FIG. 3 is a second module according to the invention with a guide vane arrangement and a seal carrier.

FIG. 3 shows a form of construction that is an alternative to that of FIG. 2, whereby, in the following discussion, primarily the differences are emphasized, this also holds true for all other embodiments. In general, in the scope of this disclosure, the same reference numbers refer to the same part or parts having the same function and hence reference is insofar always made to the description of the other respective figures. In the embodiment in accordance with FIG. 3, too, the second seal carrier wall 32 is spaced apart from the wall surface 31*b* of the first seal carrier wall 31 in the axial direction 17; that is, a gap 24 exists between the wall surface 31*b* and the axial segment 32.1 of the second seal carrier wall 32 (not depicted in detail).

The same also holds true for the axial segment 31.1 of the first seal carrier wall 31 and the second seal carrier wall 32; there exists a gap 24 there as well. With the axial segments 31.1, 32.1, the seal carrier walls 31, 32 form once again a contact-free labyrinth seal 25. Because, in comparison to the variant in accordance with FIG. 2, the axial segment 32.1 is displaced further radially inward, it forms with the seal carrier 41, in addition, a contact-free labyrinth seal 125 in spite of the radial gap 26 in between.

Figure 4:
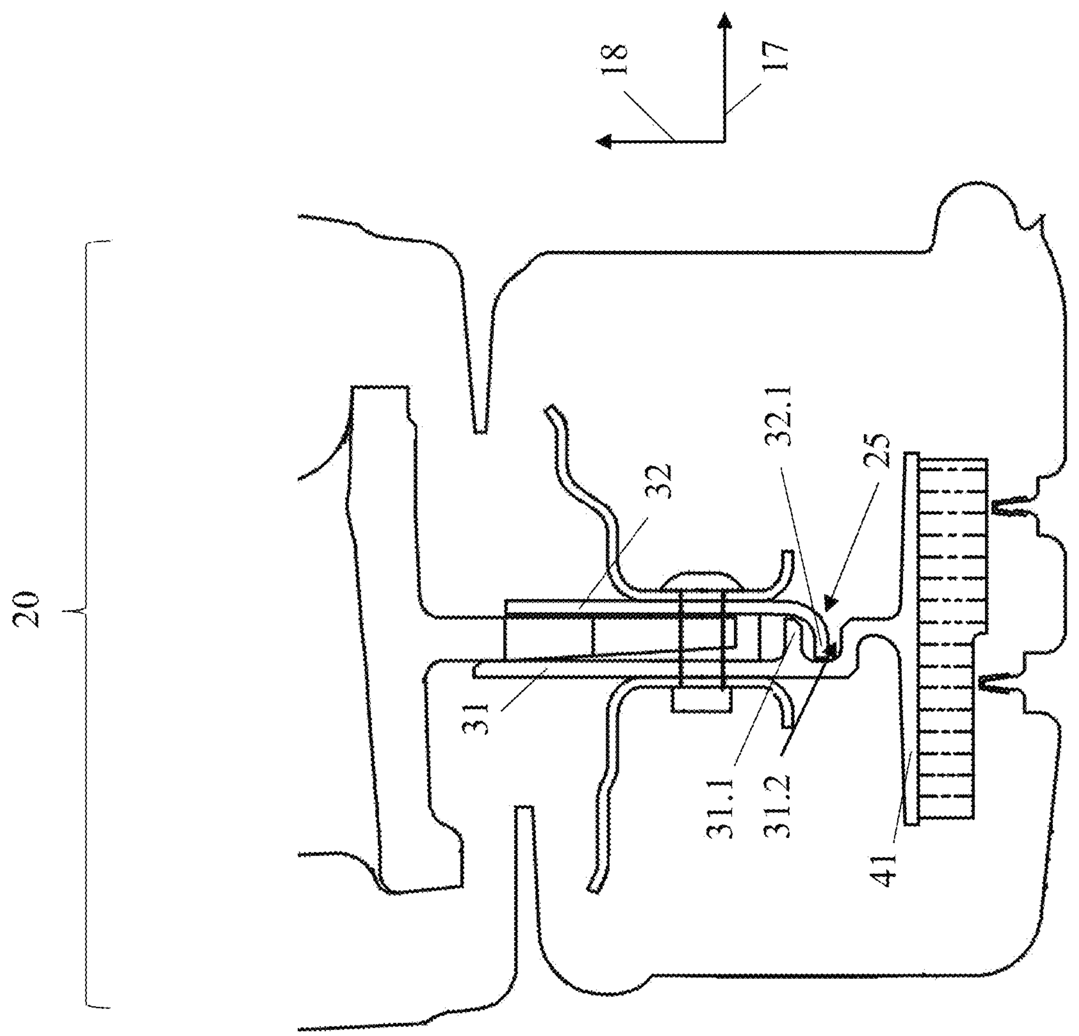
FIG. 4 is a third module according to the invention with a guide vane arrangement and a seal carrier.

In the embodiment in accordance with FIG. 4, the first seal carrier wall 31 is formed with a step 31.2, that is, as viewed in the axial section, with an axial displacement. This step 31.2 forms the contact-free labyrinth seal 25 with the axial segment 32.1 of the second seal carrier wall 32. The first seal carrier wall 31 in the present example is hereby formed, in addition, with an axial segment 31.1, which, together with the step 31.2, forms a U-shaped recess, in which the axial segment 32.1 engages. In spite of the gaps, which, for reasons of clarity, are not given reference numbers here, between the axial segments 31.1, 32.1 and the other respective seal carrier walls 31, 32, it is thereby possible to achieve a good sealing.

Figure 5:
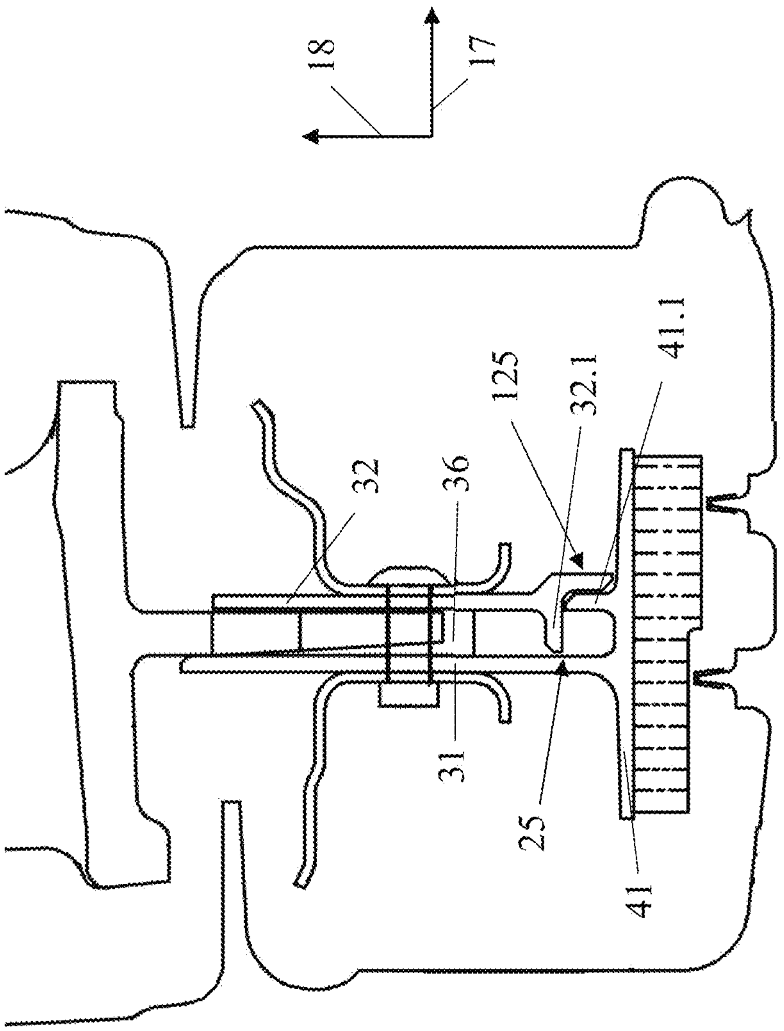
FIG. 5 is a fourth module according to the invention with a guide vane arrangement and a seal carrier.

In the embodiment in accordance with FIG. 5 as well, the seal carrier walls 31, 32 form a contact-free labyrinth seal 25 with each other and, namely, do so by way of the axial segment 32.1 of the second seal carrier wall 32. Furthermore, any leakage path is lengthened further owing to the contact-free labyrinth seal 125 between the seal carrier 41 and the second seal carrier wall 32. To this end, the seal carrier 41 is formed with a radial segment 41.1 that rises radially outward. The radial segment 41.1 hereby does not rest against the second seal carrier wall 32 either axially or radially (gaps not given reference numbers for reasons of clarity).

Figure 6:
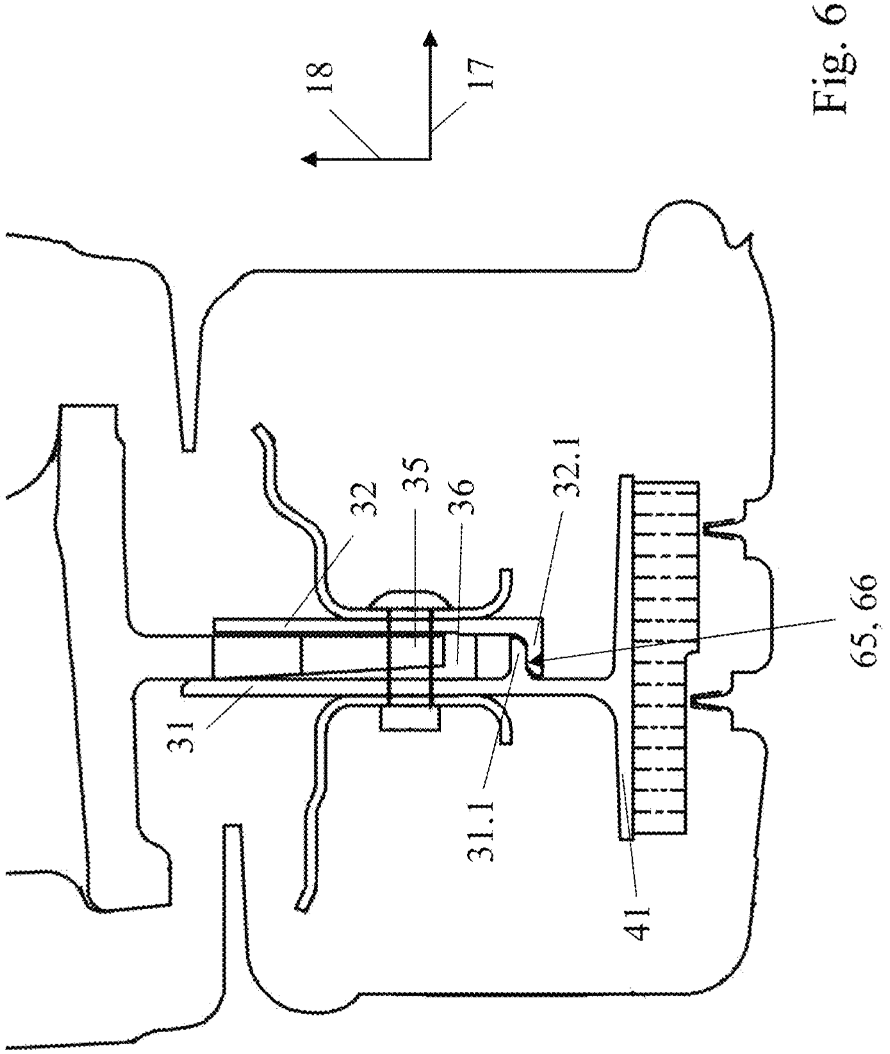
FIG. 6 is a fifth module according to the invention a with guide vane arrangement and a seal carrier.

In regard to the fundamental construction with the seal carrier walls 31, 32 that are fastened relative to each other by way of the sliding member 36 and the connecting element 35, the embodiment in accordance with FIG. 6 corresponds to the previously discussed variants. Furthermore, in this case, too, as in FIGS. 2-4, both the first seal carrier wall 31 and the second seal carrier wall 32 are each provided with an axial segment 31.1, 32.1. In contrast to the previously discussed variants, however, these axial segments 31.1, 32.1 are not spaced apart from each other, but rather are provided in a radial contact 65. Therefore, they rest against each other in the radial direction 18 and thereby form a seal 66, whereby, in the axial direction 17, a certain relative displacement is possible. In this way, it is possible to avoid an axial input of force, whereby the construction creates, at the same time, a sealing.

Figure 7:
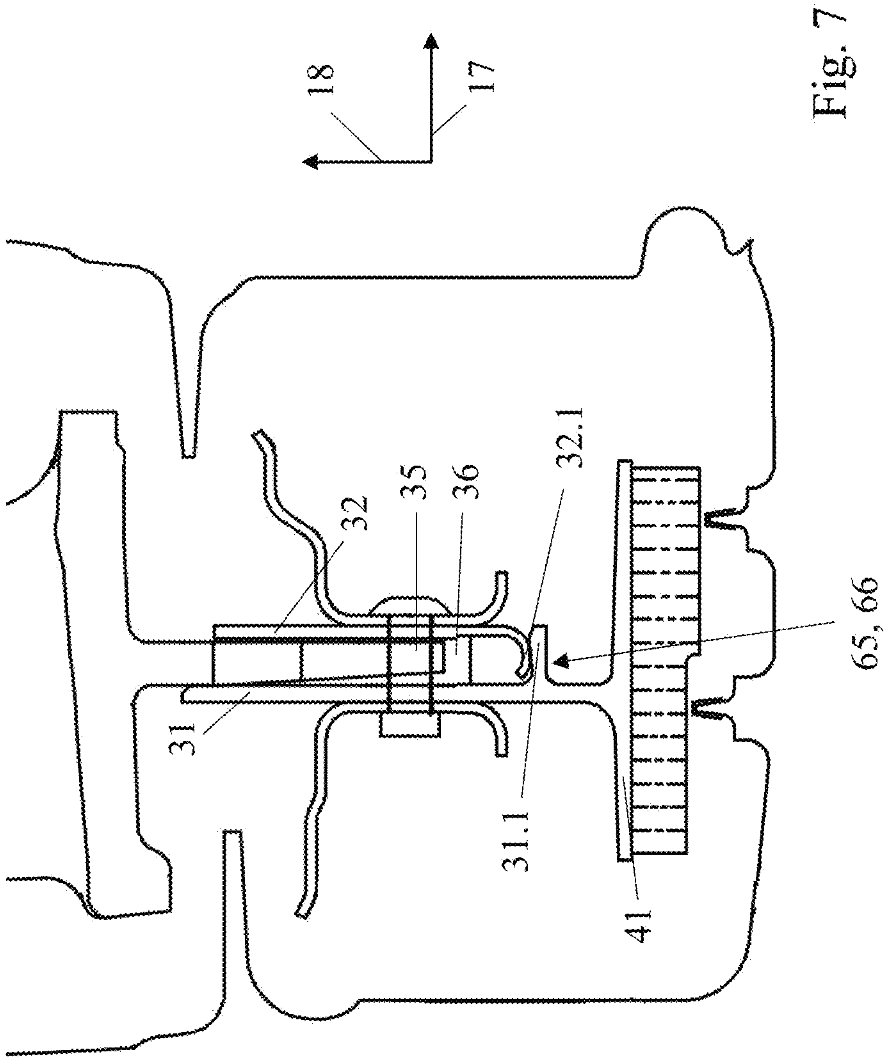
FIG. 7 is a sixth module according to the invention with a guide vane arrangement and a seal carrier.

In regard to its fundamental construction, the variant in accordance with FIG. 7 corresponds to that in accordance with FIG. 6; the seal carrier walls 31, 32 are once again in radial contact 65 with each other through a respective axial segment 31.1, 32.1. In this case, in contrast to FIG. 6, the second seal carrier wall is made of a sheet metal and the axial segment 32.1 is produced by the corresponding bending of a radially inner segment. The same holds true for the embodiment in accordance with FIG. 8, in which, in contrast to FIG. 7, the axial segment 32.1, formed from a sheet metal, rests against the axial segment 31.1 of the first seal carrier wall 31 not radially outward, but rather radially inward.

Figure 8:
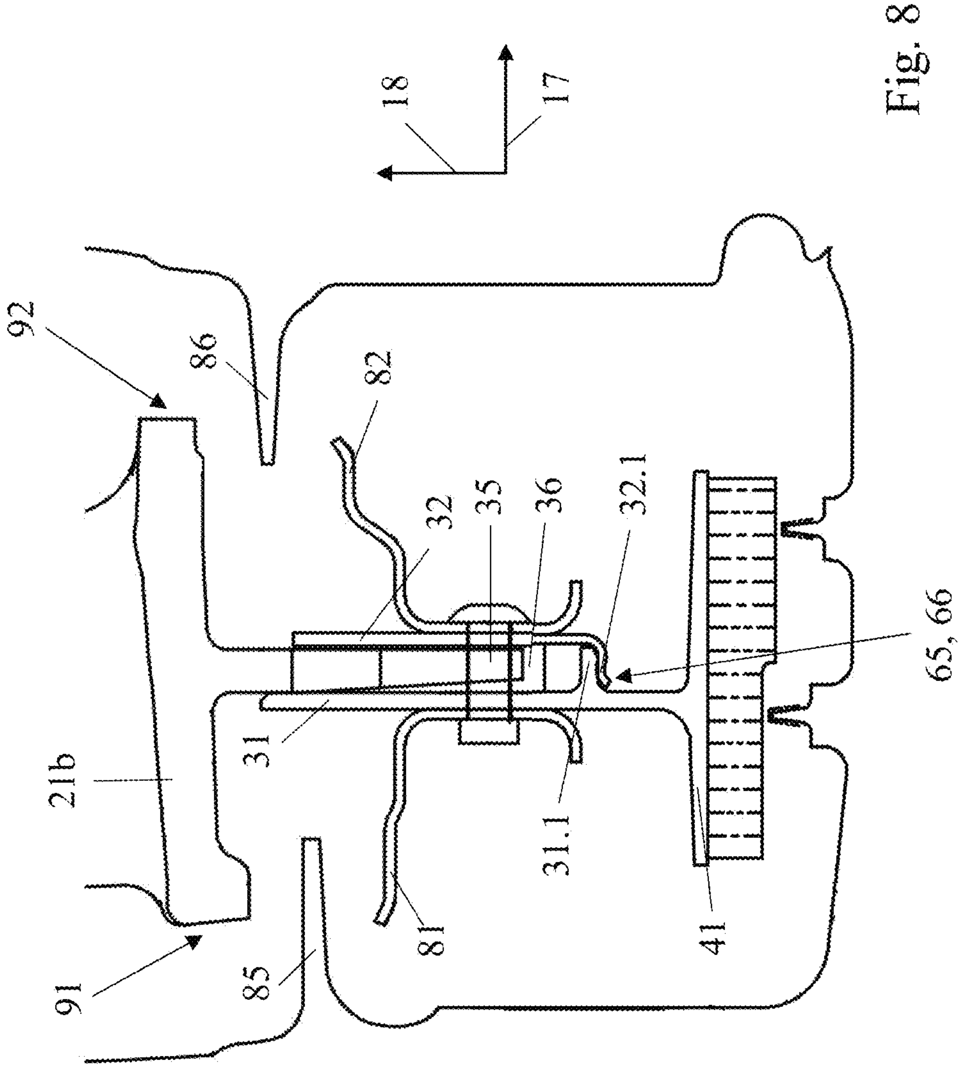
FIG. 8 is a seventh module according to the invention with a guide vane arrangement and a seal carrier.

For illustration in FIG. 8, a front sheet metal seal and a back sheet metal seal are further shown with reference numbers and are accordingly composed of multipiece parts with respect to the seal carrier walls 31, 32 and are likewise held together by the connecting element 35. The front sheet metal seal 81 forms a so-called fish mouth seal 91 together with the inner platform 21*b* and an inner platform 85 (depicted only schematically as a contour) of the upstream rotating blade arrangement; likewise, the back sheet metal seal 82 forms a fish mouth seal 92 together with the inner platform 21*b* and the inner platform 86 (shown only schematically as contour) of the downstream rotating blade arrangement. Even though depicted in the other FIG.s as well, the sheet metal seals 81, 82 are optional and the module 20 can also be provided without fish mouth seals or else, alternatively, only with a front sheet metal seal or a back sheet metal seal.

What is claimed is:

1. A module for a turbomachine, comprising:

a guide vane arrangement;

a seal carrier, which is arranged radially inside an inner platform of the guide vane arrangement;

seal carrier walls, including a first seal carrier wall having a wall surface and a second seal carrier wall; and a sliding member as well as a connecting element;

wherein the first seal carrier wall and the seal carrier are formed in a one-piece manner with each other;

wherein the seal carrier walls are multipiece in construction relative to each other and the second seal carrier wall is fastened by the connecting element to the first seal carrier wall and the seal carrier;

wherein the sliding member holds the seal carrier walls spaced from each other such that together they bound axially an intervening space, in which the guide vane arrangement engages with a radially inward extending guide pin;

wherein the second seal carrier wall is spaced apart from the wall surface of the first seal carrier wall directed in the axial direction and spaced apart from the seal carrier;

wherein the first seal carrier wall and the second seal carrier wall form a contact-free labyrinth seal with each other.

2. The module according to claim 1, wherein the second seal carrier wall and the seal carrier form a contact-free labyrinth seal with each other.

3. The module according to claim 1, wherein the second seal carrier wall comprises an axial segment protruding in the axial direction with respect to the first seal carrier wall for the formation of the contact-free labyrinth seal.

4. The module according to claim 1, wherein at least one of the seal carrier walls, as viewed in an axial section, is formed with a step for the formation of the contact-free labyrinth seal.

5. The module according to claim 1, wherein the seal carrier is positioned exclusively by the first seal carrier wall, and is otherwise free of contact radially outward with further components and/or comprises no further radially outward protruding segments.

6. The module according to claim 1, wherein, in relation to a throughflow of the module, the first seal carrier wall is arranged upstream and the second seal carrier wall is arranged downstream.

7. The module according to claim 1, wherein the sliding member is multipiece in construction with respect to the seal carrier walls, and the connecting element passes through the sliding member.

8. The module according to claim 1, wherein the first seal carrier wall is formed monolithically with the seal carrier and forming a T shape with the seal carrier in cross section.

9. A turbine for a turbomachine formed with the module according to claim 1.

* * * * *